United States Patent
Piscaer et al.

(10) Patent No.: US 6,682,047 B1
(45) Date of Patent: Jan. 27, 2004

(54) CERAMIC VALVE

(75) Inventors: Petrus Josephus Carolus Piscaer, Rotterdam (NL); Tjasse Willem Biwenga, Utrecht (NL); Adrianus Petrus Matthijs van Straten, Linschoten (NL)

(73) Assignee: Sara Lee/DE N.V., Utrecht (NL)

( * ) Notice: Subject to any disclaimer, the term of this patent is extended or adjusted under 35 U.S.C. 154(b) by 0 days.

(21) Appl. No.: 09/890,305

(22) PCT Filed: Jan. 13, 2000

(86) PCT No.: PCT/NL00/00062
§ 371 (c)(1),
(2), (4) Date: Oct. 15, 2001

(87) PCT Pub. No.: WO00/45073
PCT Pub. Date: Aug. 3, 2000

(30) Foreign Application Priority Data

Jan. 29, 1999 (NL) .............................................. 1011177

(51) Int. Cl.[7] .................................................. F16K 3/00
(52) U.S. Cl. .............. 251/326; 251/129.11; 251/129.2; 222/504; 222/559
(58) Field of Search ....................... 251/129.11, 129.12, 251/129.13, 129.2, 326, 328, 329; 222/534, 559

(56) References Cited

U.S. PATENT DOCUMENTS

| | | | | |
|---|---|---|---|---|
| 159,729 A | * | 2/1875 | Wheelock | 251/328 |
| 251,382 A | * | 12/1881 | Shaw | 251/328 |
| 455,810 A | * | 7/1891 | Wheelock | 251/328 |
| 1,546,907 A | * | 7/1925 | Krueger | 251/20 |
| 2,427,755 A | * | 9/1947 | Wederberg | 251/328 X |
| 3,171,439 A | * | 3/1965 | Lansky et al. | 137/625.64 |
| 3,189,318 A | * | 6/1965 | Monson | 251/328 X |
| 3,396,750 A | * | 8/1968 | Nilsson | 137/625.25 |
| 3,559,685 A | | 2/1971 | deFries | |
| 4,531,539 A | * | 7/1985 | Jandrasi et al. | 251/326 X |
| 4,986,085 A | * | 1/1991 | Tischer | 251/326 X |

FOREIGN PATENT DOCUMENTS

| | | |
|---|---|---|
| DE | 42 32 262 | 4/1994 |
| DE | 196 47 384 | 4/1994 |
| DE | 195 03 618 | 8/1996 |
| EP | 0 307 497 | 3/1989 |
| EP | 0 361 183 | 4/1990 |
| EP | 0 409 305 | 1/1991 |
| GB | 2 095 798 | 10/1982 |

* cited by examiner

*Primary Examiner*—Gene Mancene
*Assistant Examiner*—Eric Keasel
(74) *Attorney, Agent, or Firm*—Merchant & Gould, P.C.

(57) ABSTRACT

The electrically operable ceramic valve of a beverage machine comprises at least one inlet (2), at least one outlet (4), and at least one liquid flow channel (8) extending between the inlet and the outlet, for controlling a liquid flow from the inlet to the outlet. The ceramic valve further comprises a first ceramic subhousing (16) and a second ceramic subhousing (18) through which the liquid flow channel extends and which are designed to be displaceable along each other by means of an electric drive. The liquid flow channel comprises a bend (8) extending at least for a part in the second subhousing, while in an opened condition of the valve the liquid flow channel, upstream of the second subhousing and downstream of the second subhousing, extends in at least the first subhousing. The second subhousing is displaced along the first subhousing by means of the electric drive for controlling the magnitude of the liquid flow.

6 Claims, 14 Drawing Sheets

CERAMIC VALVE

This invention relates to an electrically operable ceramic valve of a beverage machine which is adapted for preparing beverages suitable for consumption, comprising at least one inlet, at least one outlet, and at least one liquid flow channel: extending between the inlet and the outlet, the ceramic valve further comprising a first ceramic subhousing and a second ceramic subhousing through which the liquid flow channel extends and which are adapted to be displaceable along each other by means of an electric drive, for controlling a liquid flow from the inlet to the outlet, the liquid flow channel comprising a bend extending at least for a part in the second subhousing, while the liquid flow channel in an opened condition of the valve extends upstream of the second subhousing and downstream of the second subhousing in at least the first subhousing, and the first subhousing comprises a first aiding surface having at least one outflow opening and at least one inflow opening, the liquid flow channel extending from the first subhousing through the outflow opening to the bend in the second subhousing, and the liquid flow channel extending from the bend through the inflow opening in the first subhousing, while the second subhousing comprises a second sliding surface.

Such a ceramic valve is known from EP-A-0 361 183. In this valve, in preparing beverage s for consumption, beer is fed from a vat to a first inlet. The second subhousing is then in a second extreme position. For cleaning the valve, the second subhousing is slid relative to the first subhousing into a first extreme position. Thereafter, to a second inlet, a cleaning agent is supplied, which flows back via the second subhousing to the first subhousing to subsequently leave the first subhousing via the first inlet which functions as outlet for cleaning. A disadvantage of the known valve is that sliding the second subhousing relative to the first subhousing is accompanied by a relatively great friction between the subhousings. Accordingly, this requires much energy. The valve according to the invention is intended to provide a solution to this disadvantage and is characterized in that the first sliding surface is provided with at least one circumferential edge closed in itself which projects relative to a part of the first sliding surface where this edge is not situated, in the direction of the second sliding surface, so that an upper side of this projecting edge abuts against the second sliding surface and forms a sealing with the second sliding surface, or that the second sliding surface is provided with at least one circumferential edge closed in itself which projects relative to a part of the second sliding surface where this edge is not situated, in the direction of the first sliding surface, so that an upper side of this projecting edge abuts against the first sliding surface sand forms a sealing with the first sliding surface.

The upright edge has the advantage that in use little resistance is sustained when the second subhousing is displaced relative to the first subhousing, since in that case the contact surface of the first and the second subhousing is defined by the upright edge.

A further disadvantage of the known valve is that the first inlet is not suitable for functioning as outlet when liquids are delivered for preparing beverage suitable for consumption. When the second subhousing is in the first extreme position, so that the second inlet is blocked, the first inlet which would have to function as outlet is in open communication with a third outlet, which is undesirable from a hygienic and practical viewpoint. According to another aspect of the invention, that problem is also solved. The invention according to this aspect concerns an electrically operable ceramic valve of a beverage machine which is adapted for preparing beverages suitable for consumption, comprising at least one inlet, at least one outlet, and at least one liquid flow channel extending between the inlet and the outlet, the ceramic valve further comprising a first ceramic subhousing and a second ceramic subhousing through which the liquid flow channel extends and which are adapted to be displaceable along each other by means of an electric drive, for controlling a liquid flow from the inlet to the outlet, the liquid flow channel comprising a bend extending at least for a part in the second subhousing, while the liquid flow channel in an opened condition of the valve extends upstream of the second subhousing and downstream of the second subhousing in at least the first subhousing, and the first subhousing comprises a first sliding surface having at least one outflow opening and at least one inflow opening, the liquid flow channel extending from the first subhousing through the outflow opening to the bend in the second subhousing, and the liquid flow channel extending from the bend through the inflow opening into the first subhousing, while the second subhousing comprises a second sliding surface, and the second subhousing is slidable along the first subhousing between a first and second extreme position, and in the first extreme position the inflow opening of the first subhousing and the outflow opening of the first subhousing form a fluid communication with the opening in the second subhousing, characterized in that in the second extreme position the inflow opening of the first subhousing and/or the outflow opening of the first subhousing is closed off by the sliding surface of the second subhousing.

A ceramic valve of the type described in the opening paragraph is further known from EP-0 307 497. In this known valve, the first subhousing and the second subhousing consist of rotatable ceramic disks located against each other and equipped with distribution channels. A disadvantage of the known apparatus is that additionally, a third subhousing is present, while each of the subhousings are of disk-shaped design and the second subhousing is clamped between the first subhousing and the third subhousing. The second subhousing is adapted to be rotatable relative to the first and third subhousing. Because the second subhousing is clampingly received between the first and Bird subhousing, the rotation of the second subhousing will take relatively much energy Moreover, the accuracy with which the second subhousing could be set relative to the first subhousing is relatively low.

The ceramic valve according to the invention is characterized in that the liquid flow channel comprises a bend extending at least for a part in the second subhousing, while the liquid flow channel in an opened condition of the valve extends upstream of the second subhousing and downstream of the second subhousing in at least the first subhousing;

Since the bend extends in the second subhousing, the valve only needs to comprise two subhousings adapted for relative displacement.

In particular, the second subhousing is displaced (translated) along the first subhousing by means of the electrical drive for controlling the liquid flow. The translation of the first subhousing relative to the second subhousing has the advantage that it can be made of very simple design.

Preferably, in the sliding surface of the second subhousing an opening is present through which the liquid Sow channel extends from the outflow opening of the first subhousing and through which the liquid flow channel extends from the second subhousing to the inflow opening of the first subhousing. Then the bend can in fact consist of not more than a cavity in the sliding surface, while the cavity also contains the opening mentioned.

For a highly advanced embodiment of the valve, it holds that the liquid flow channel has a cross section of an oval shape at at least one position in the interface between the first subhousing and the second subhousing. What is achieved if, in addition, a long axis of the oval shape is at least substantially directed perpendicularly to a direction of movement of the second subhousing relative to the first subhousing, is that in the direction of movement only a relatively small displacement of the second housing relative to the first housing is needed to bring the valve from an opened condition to a closed condition and vice versa. Moreover, a displacement of the second housing relative to the first housing when the valve is nearly closed corresponds with a change in the passage area of the valve which is relatively small relative to the change in the passage area occuring upon the same displacement of the second housing relative to the first housing when the valve is almost completely opened A fine adjustment of a relatively small passage area is thus enabled.

The invention will presently be further explained with reference to the drawing. In the drawing:

FIG. 7b is a side elevation of the valve according to FIG. 7a;

Figure 5:
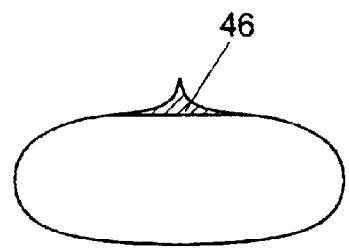
FIG. 5 is a view of a possible embodiment of an opening in the second subhousing according to FIG. 1.
Figures 6A, 6B, 6C:
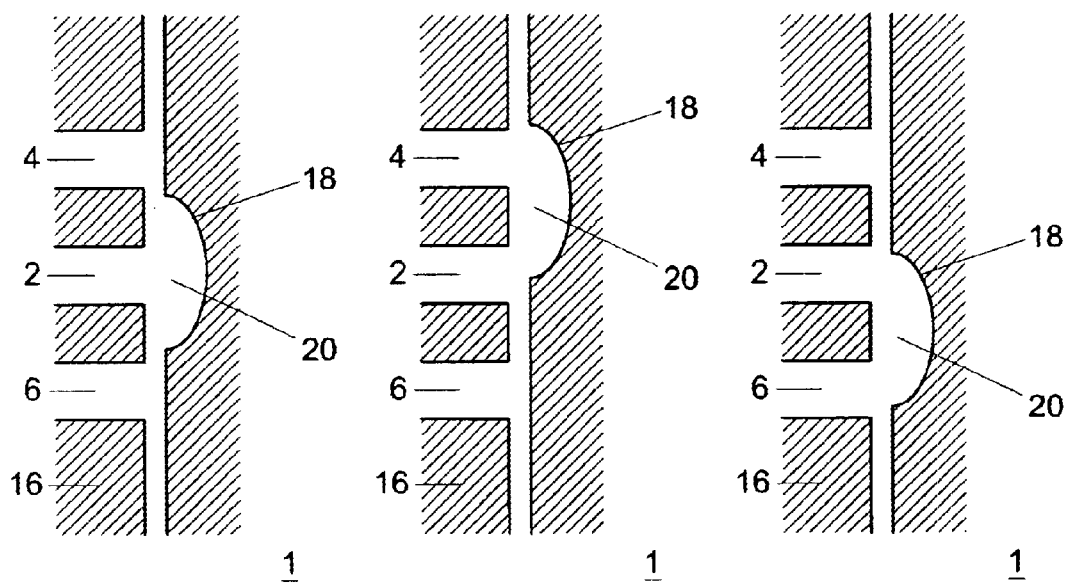
FIGS. 6a–6c are schematic cross sections of a first alternative embodiment of a valve according to the invention in, respectively, a closed condition, a first opened condition and a second opened condition.
Figure 7A:
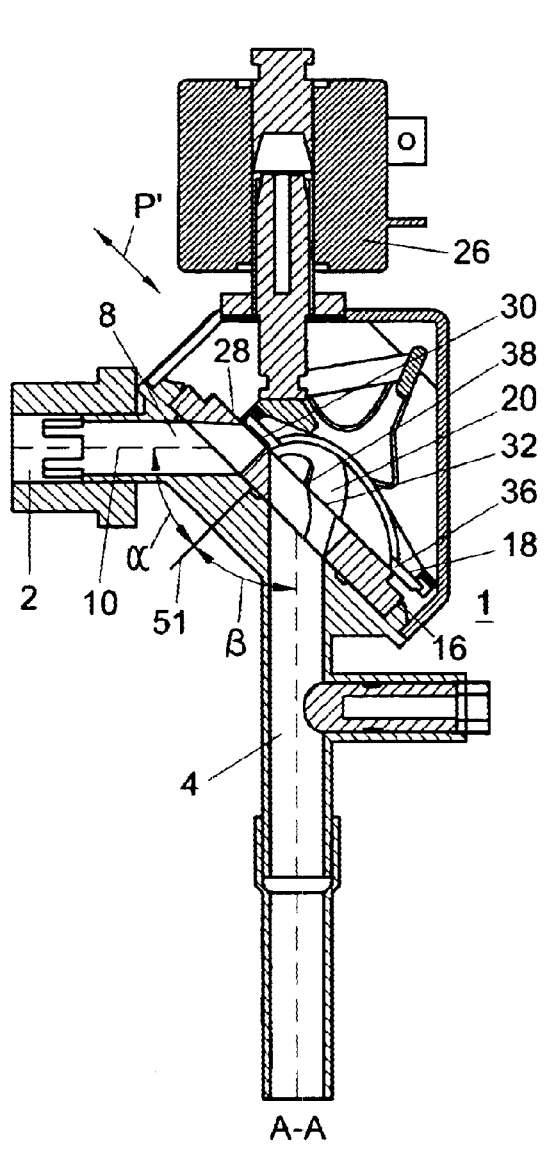
FIG. 7a is a cross section of a second alternative embodiment of a valve according to the invention.
Figure 7B:
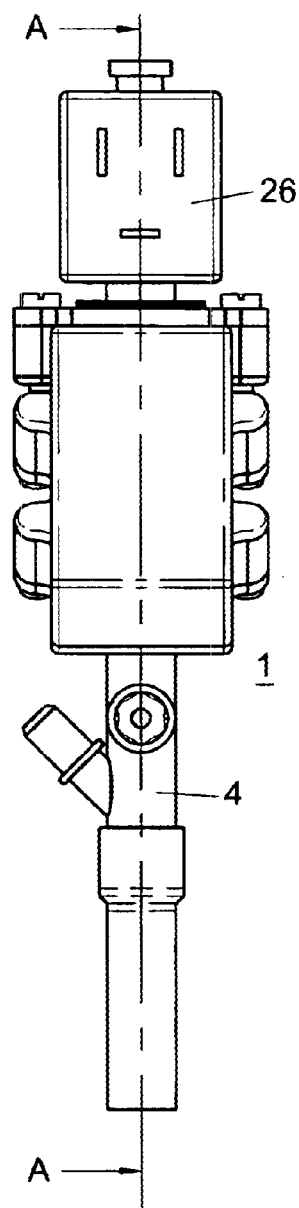
Figure 7C:
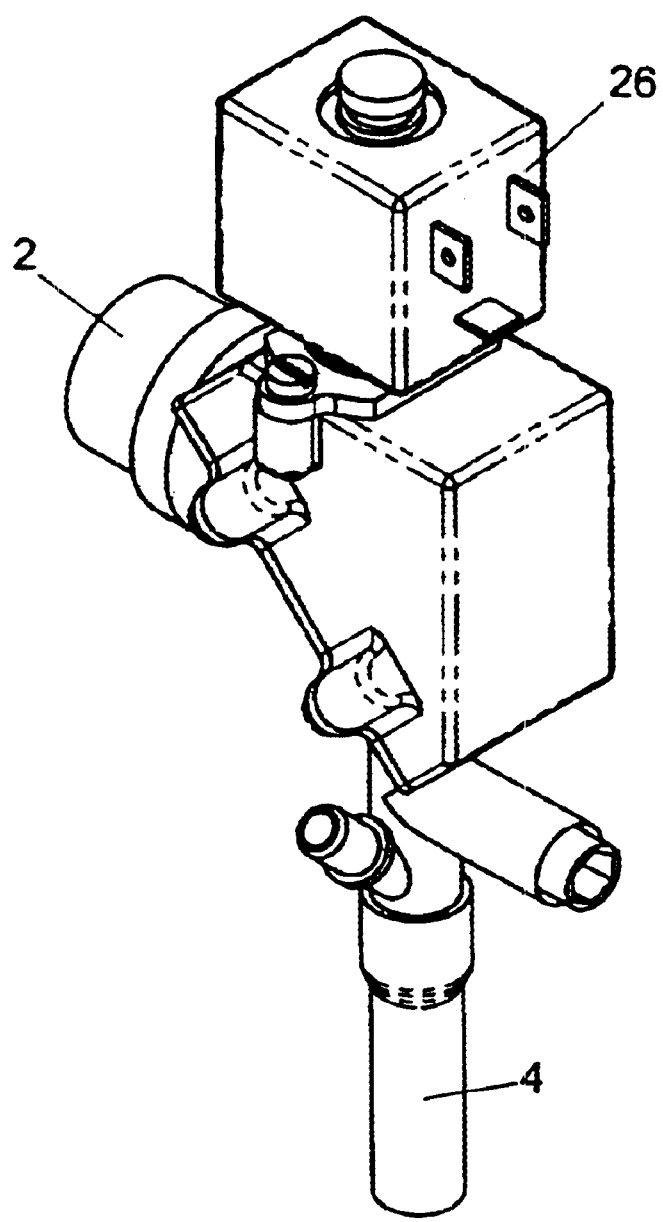
Figure 7D:
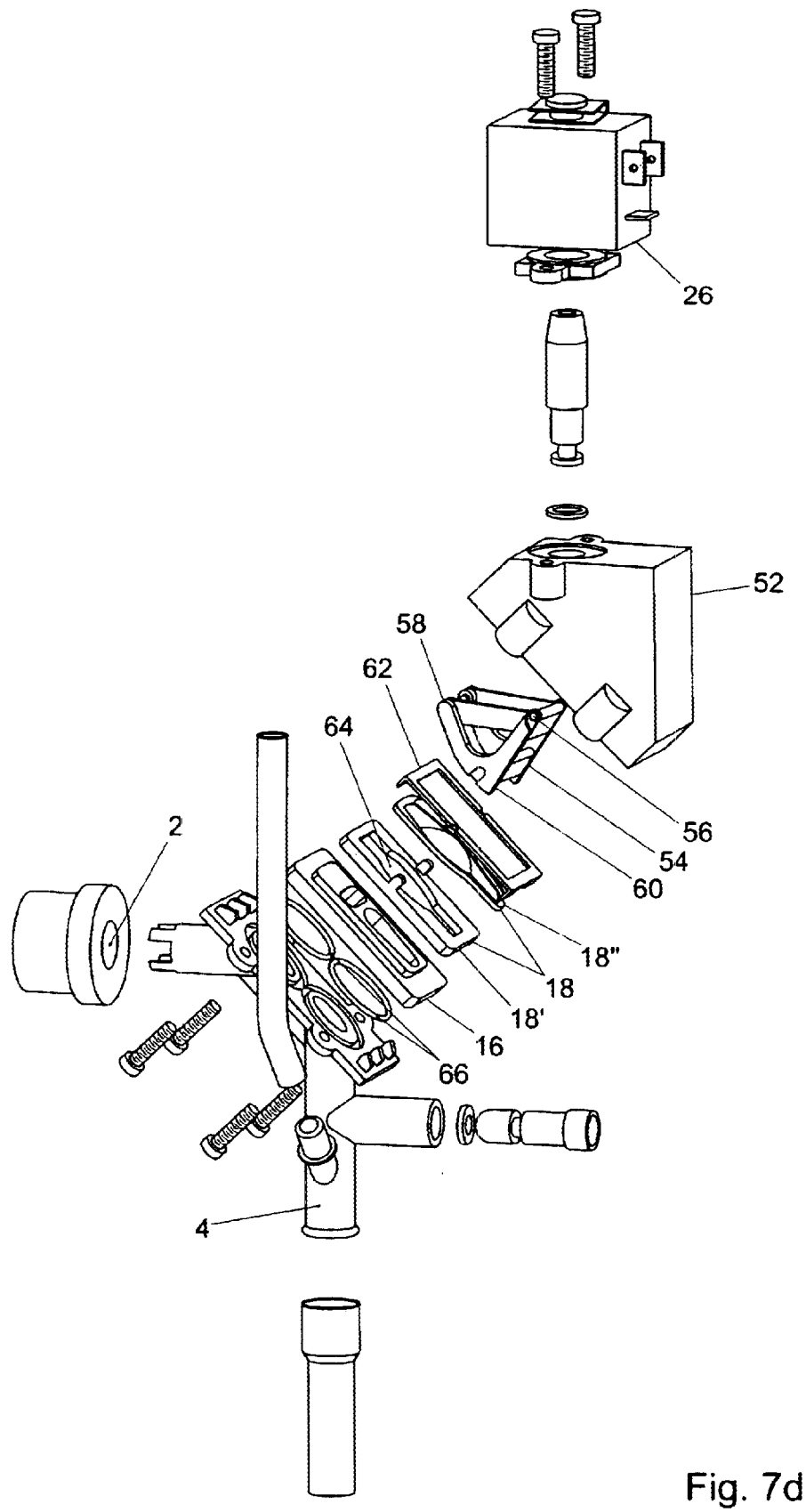
Figure 7E:
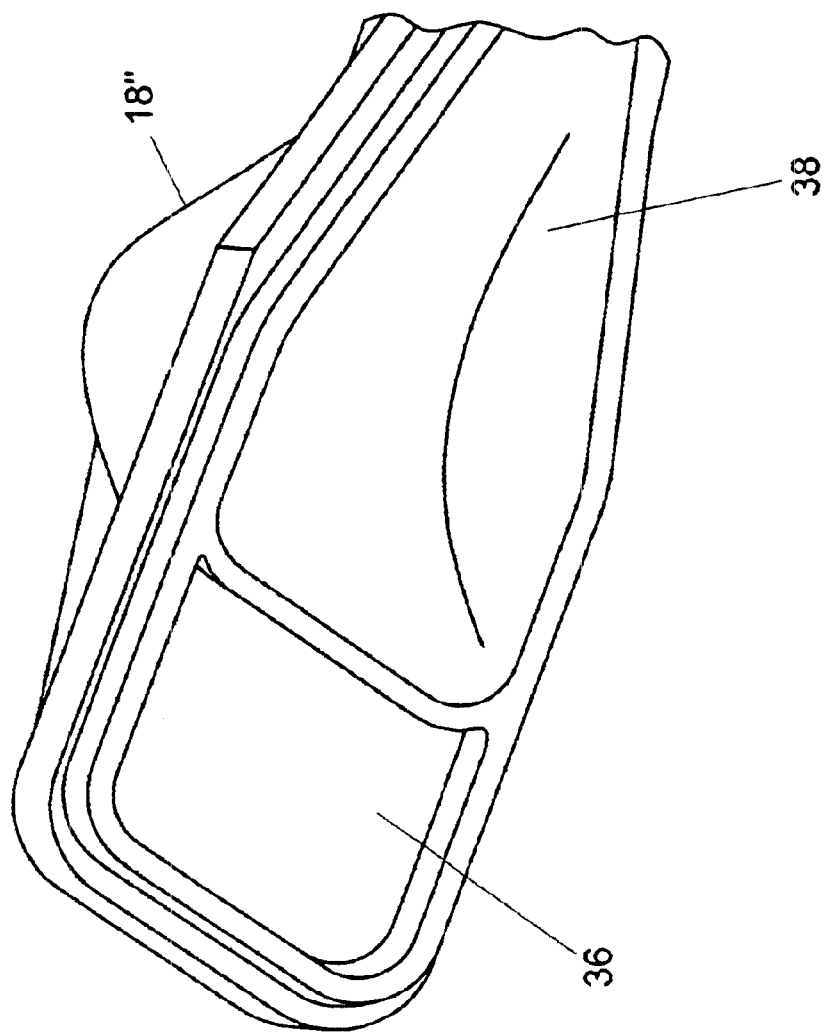
Figure 7F:
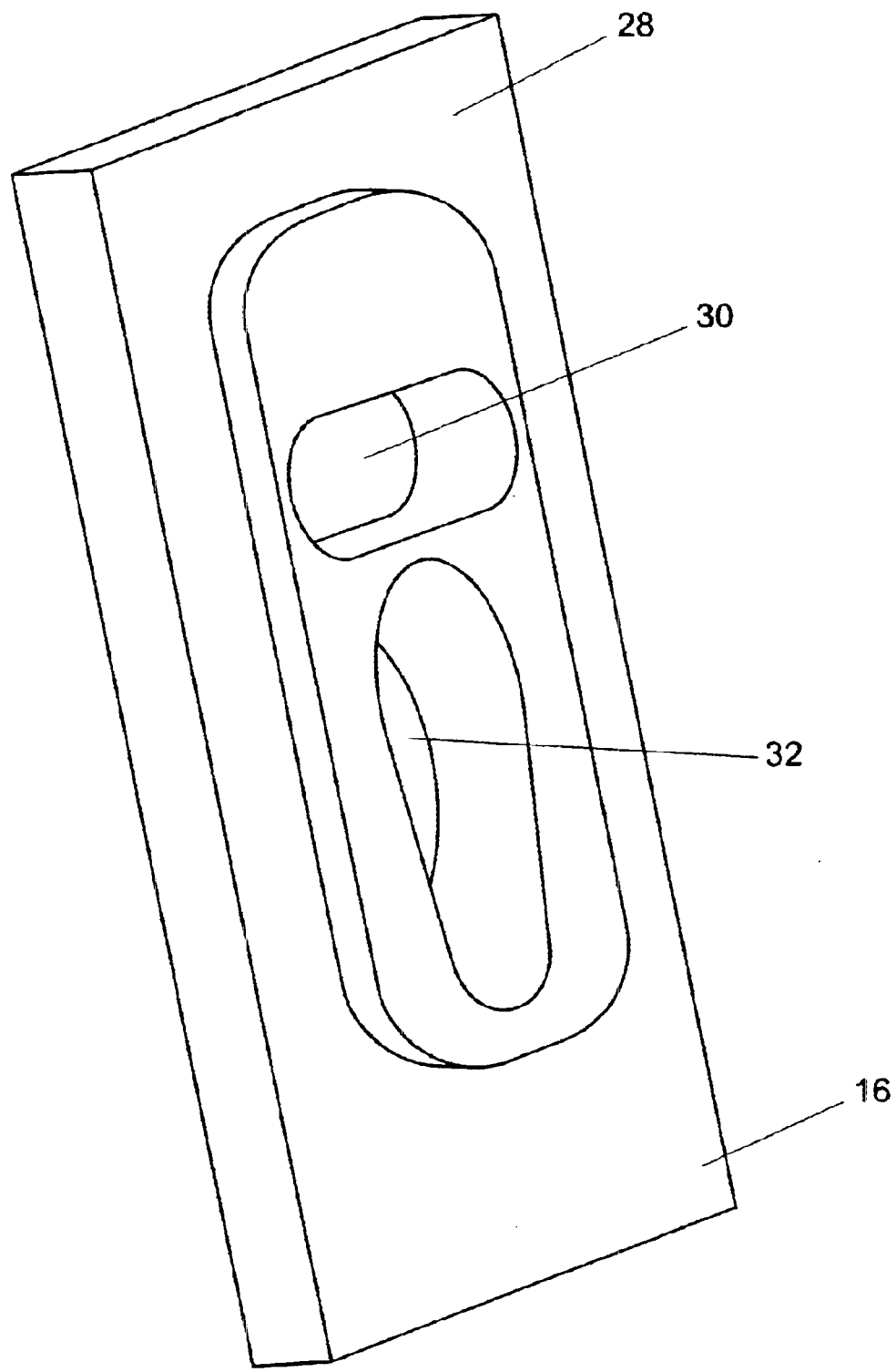
Figure 7G:
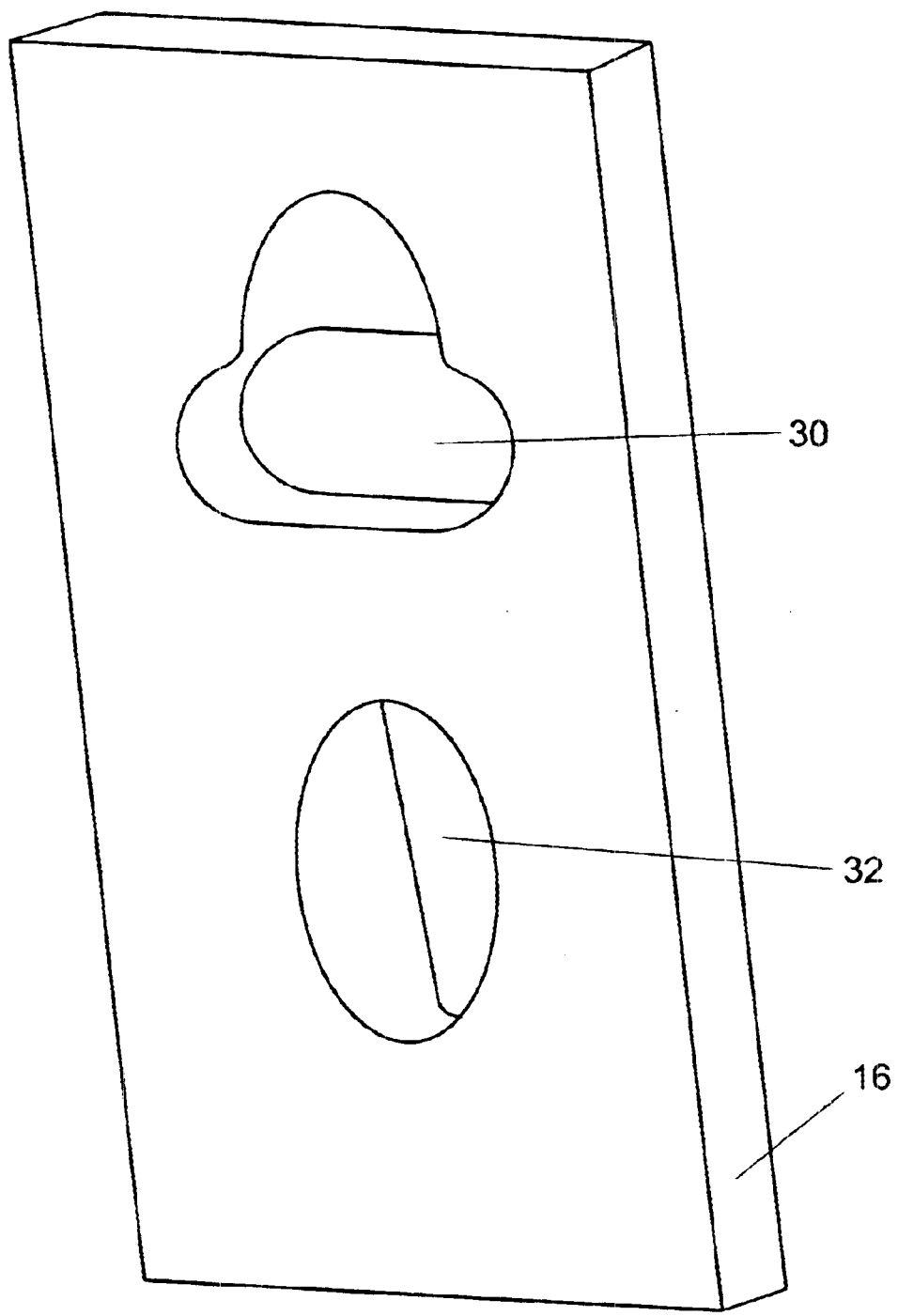
Figure 8A:
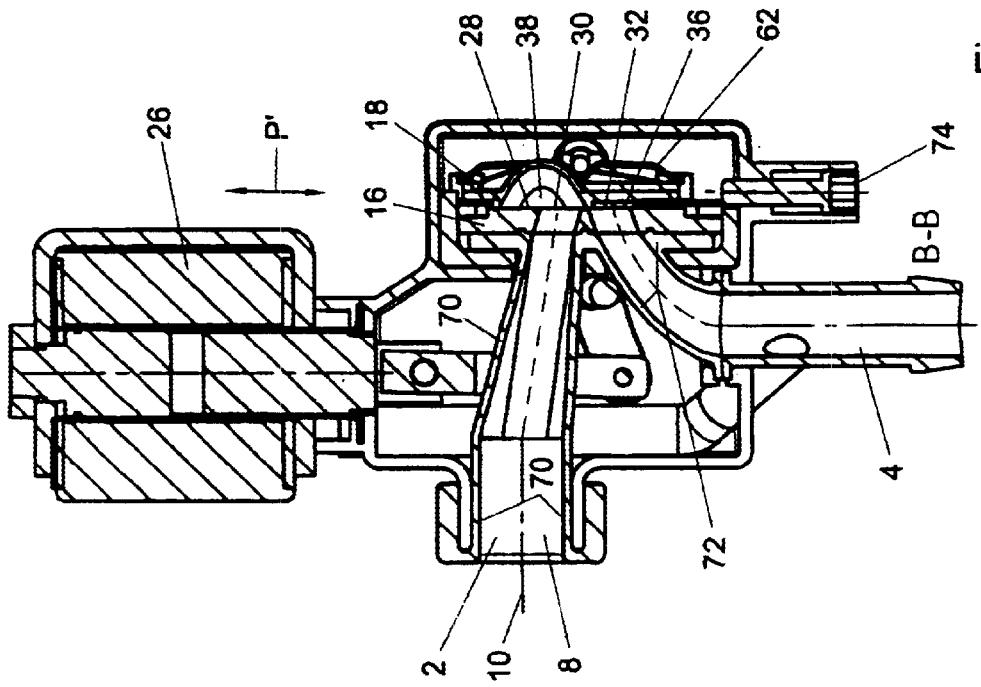
Figure 8B:
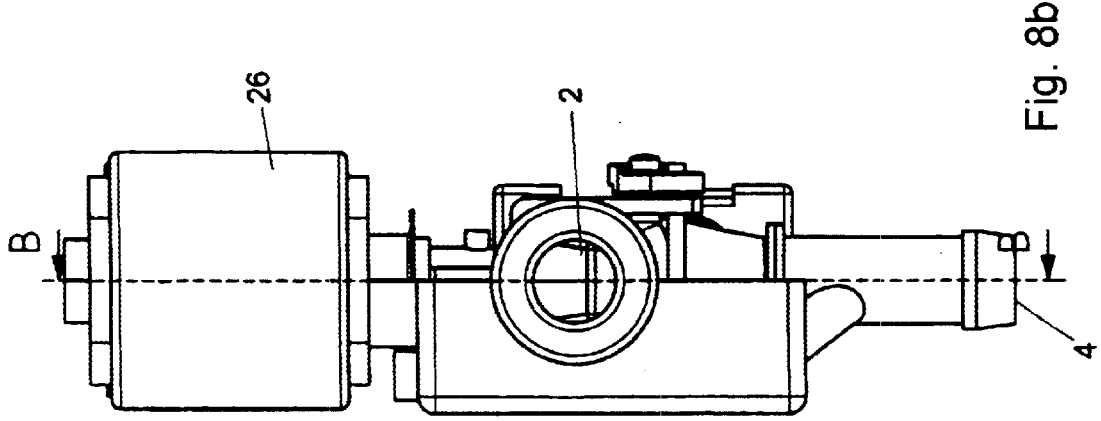
Figure 8D:
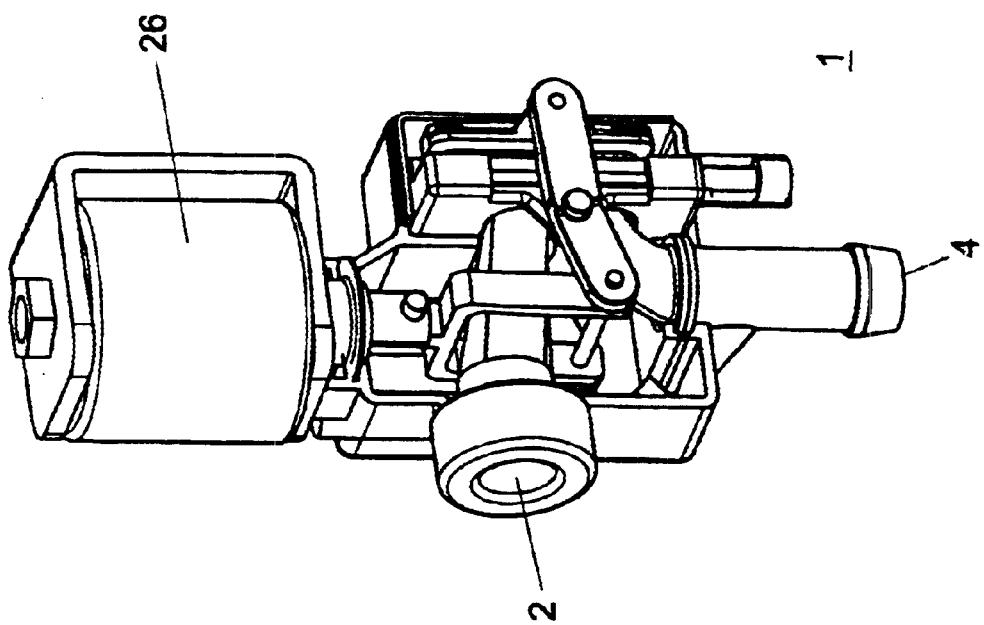
Figure 8C:
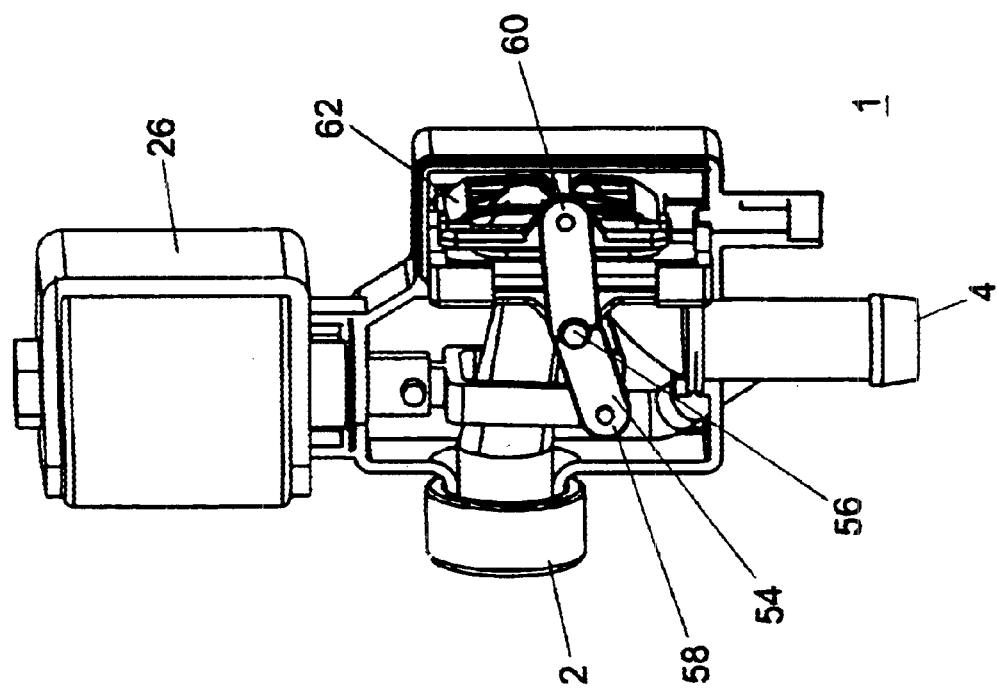
Figure 9:
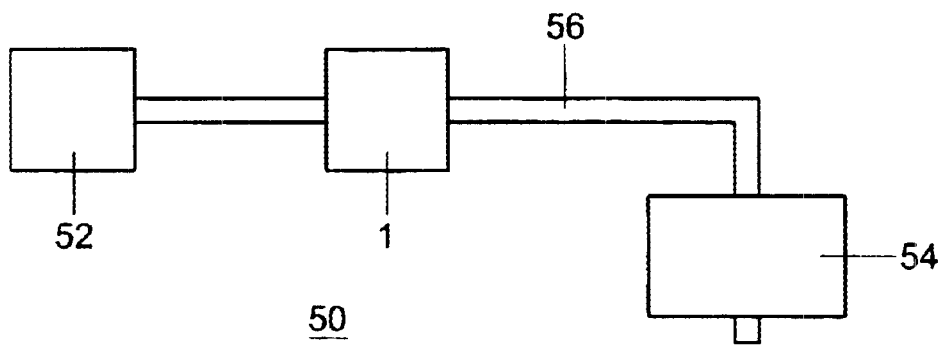
Figure 10:
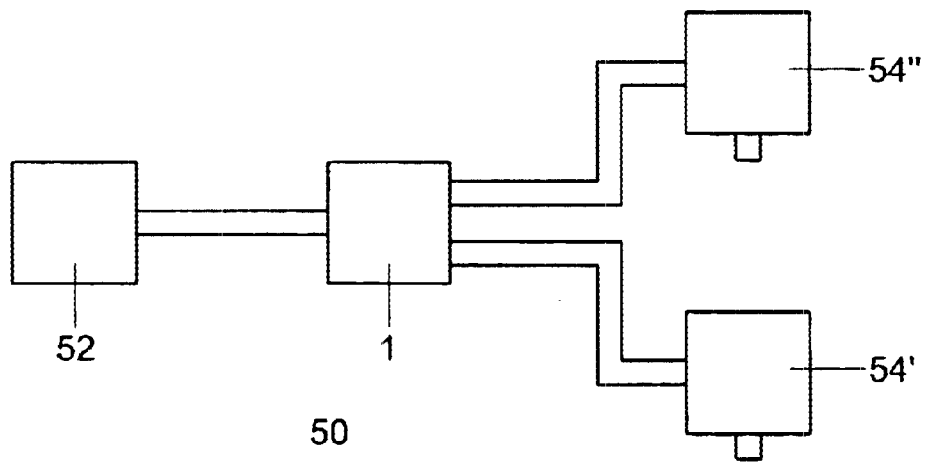

FIG. 7c if a perspective view of the valve according to FIG. 7a;

FIG. 7d is a perspective exploded view of a valve according to FIG. 7a;

FIG. 7e is a bottom plan view of a part of the valve according to FIG. 7a;

FIG. 7f shows in perspective a view of a first side of the first subhousing of the valve according to FIG. 7d, which first side is directed towards the second subhousing;

FIG. 7g shows in perspective a view of the first subhousing on a side located opposite the side shown in FIG. 7f;

FIG. 8a shows a cross section of a third alternative embodiment of a valve according to the invention;

FIG. 8b shows a partly broken-away view of the valve of FIG. 8a;

FIG. 8c shows a broken-away side elevation of the valve according to FIG. 8a;

FIG. 8d shows a filled up view of the valve according to FIG. 8a;

FIG. 9 shows a possible embodiment of a beverage machine comprising a valve according to FIGS. 1–5, 6, 7 and 8; and FIG. 10 shows a possible embodiment of a beverage machine provided with a valve according to FIGS. 6a–6c.

Figure 1:
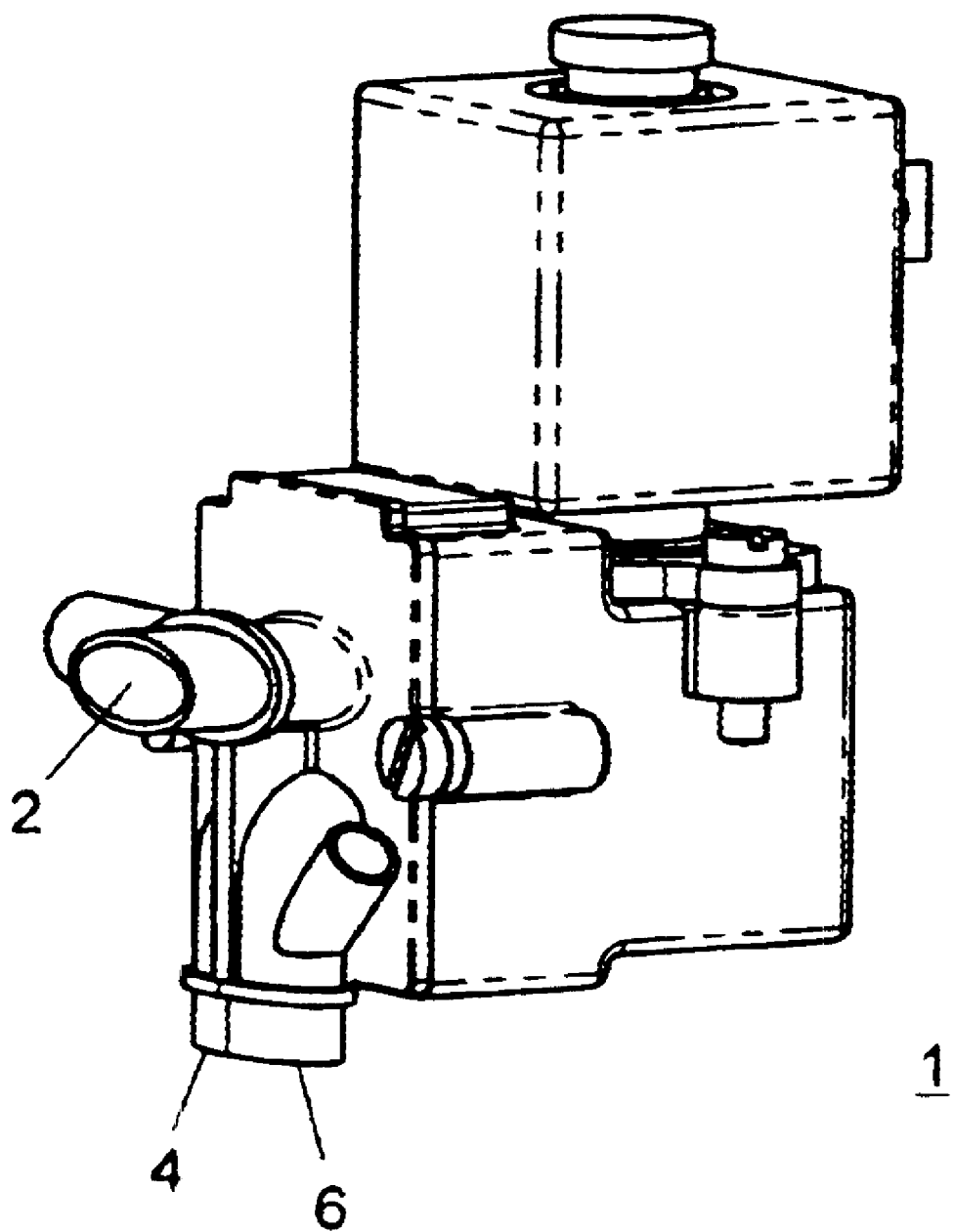
FIG. 1 is an elevation of a possible embodiment of a ceramic valve according to the invention.
Figure 2:
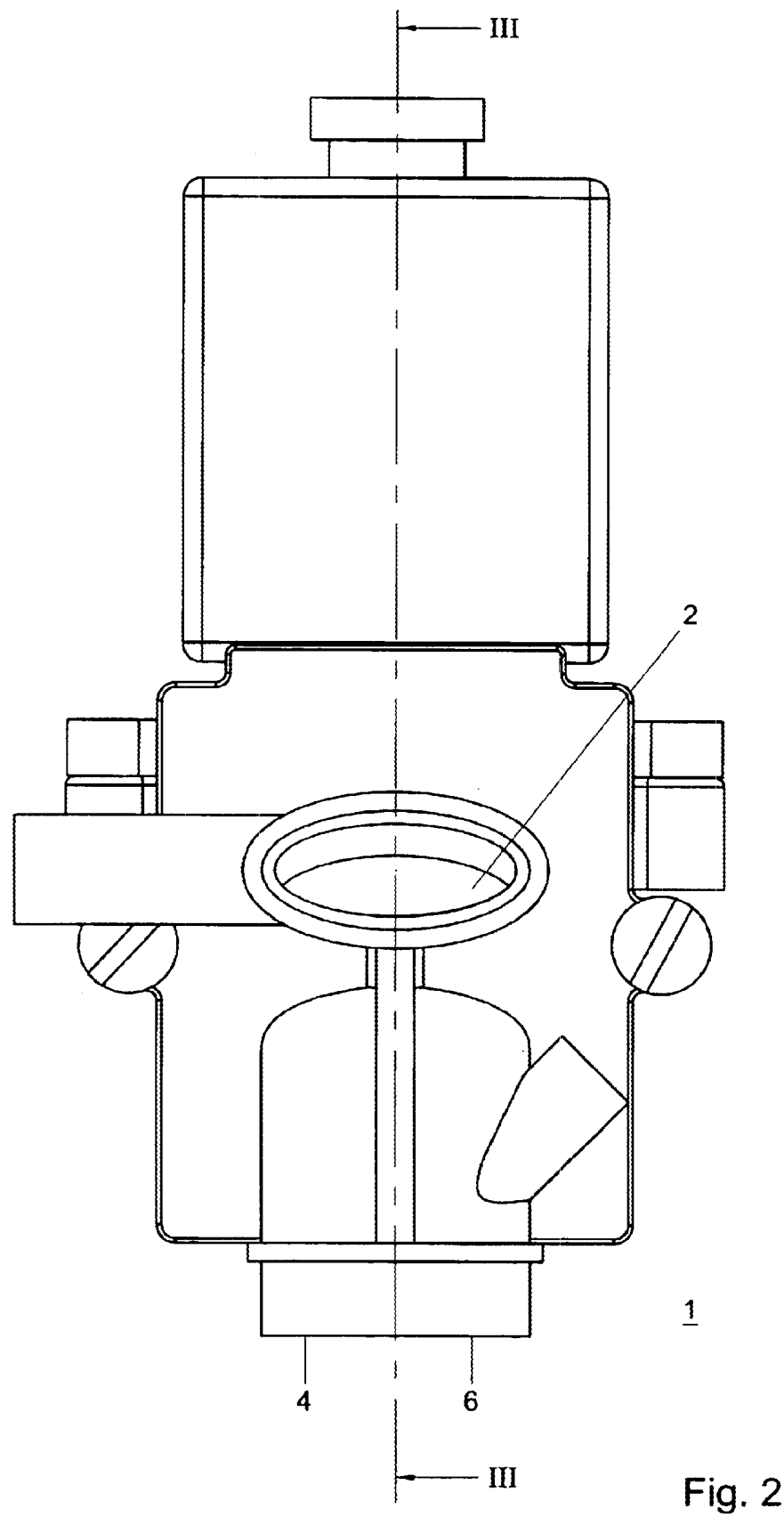
FIG. 2 is a front view of the valve according to FIG. 1.
Figure 3:
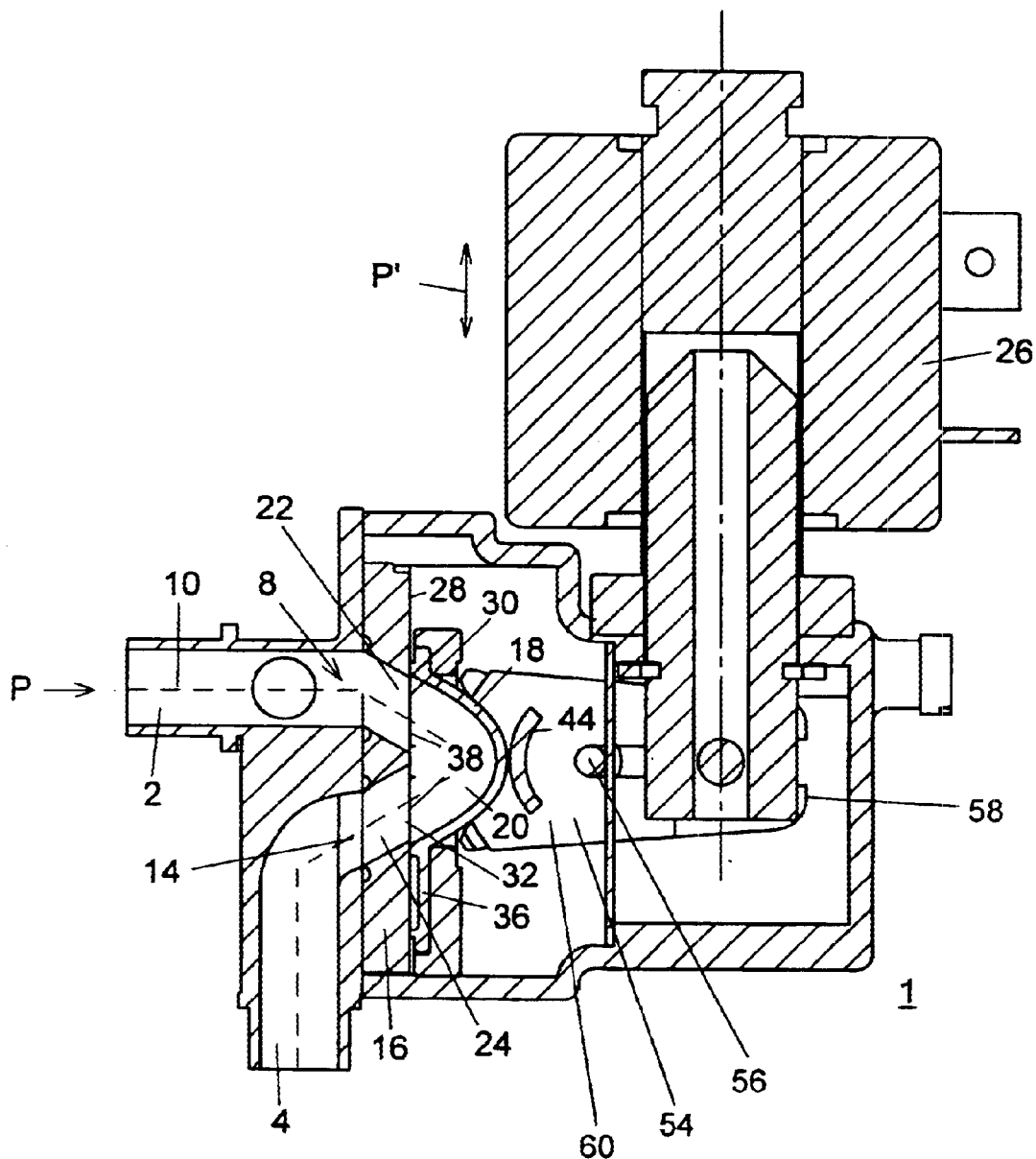
FIG. 3 is a cross section taken on the line III—III of FIG. 2.
Figure 4:
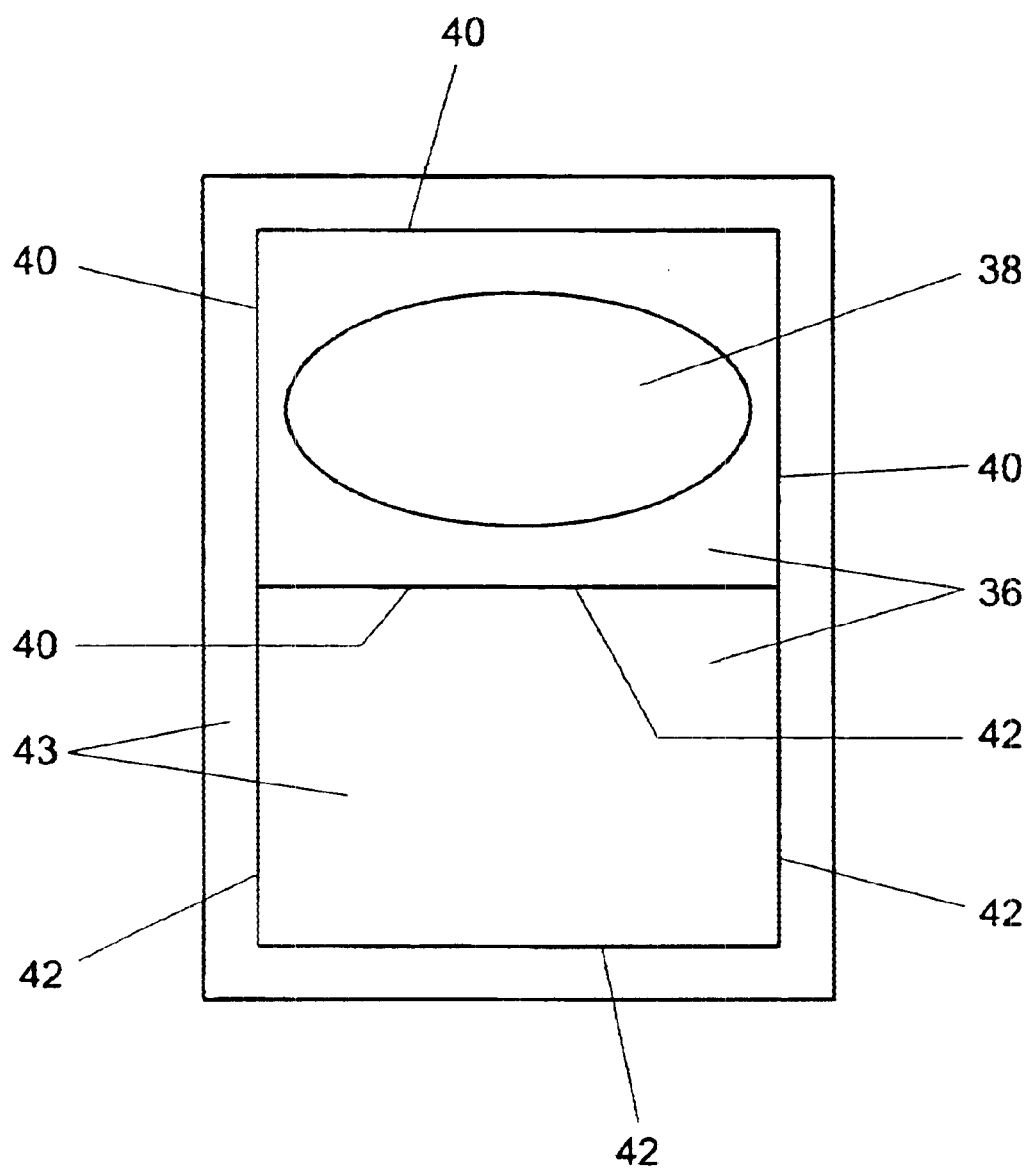
FIG. 4 is a view of the second subhousing of the valve according to FIG. 1 in the direction of the arrow P according to FIG. 3.

In FIGS. 1–3, reference numeral 1 designates an electrically operable ceramic valve suitable to be mounted in a beverage machine. The ceramic valve 1 comprises at least one inlet 2 and at least one outlet 4, 6. In this example, the ceramic valve comprises a first outlet 4 and a second outlet 6. Between the inlet 2 and the outlet 4 extends a first liquid flow channel 8, the centerline of which is shown in FIG. 3 by means of a broken line 10. Also, between the inlet 2 and the second outlet 6, a second liquid flow channel 12 extends, which coincides with the first liquid flow channel 8 from the inlet 2 as far as the point 14 in FIG. 3. The further course of the first and second liquid flow channel 8, 12 is mirror-symmetrical with respect to broken line III in FIG. 2.

The ceramic valve further comprises a first ceramic subhousing 16 and a second ceramic subhousing 18 through which the two liquid flow channels 8, 12 extend. What is indicated hereinafter in respect of the first liquid flow channel 8 also holds true of the second liquid flow channel 12. The first liquid flow channel 8 comprises a bend 20 extending at least partly in the second subhousing 18. Further, the liquid flow channel 8, upstream of the second subhousing 18, extends in at least the first subhousing. This portion of the liquid flow channel is designated in FIG. 3 by reference numeral 22. It also holds true that the liquid flow channel, downstream of the second subhousing, extends in at least the first subhousing 16. This part is indicated in FIG. 3 by reference numeral 24. The bend 20 therefore provides that the liquid flow channel when merging, viewed in the direction of flow, from the first subhousing into the second subhousing, is bent back in the direction of the first subhousing and eventually merges from the second subhousing into the first subhousing.

The valve further comprises an electrical drive 26 by means of which the second subhousing can be moved along the first subhousing, i.e. translated in the direction of the arrow P as shown in FIG. 3. Accordingly, this involves a linear movement of the second subhousing 18 relative to the first subhousing 16.

The first subhousing 16 further comprises a first sliding surface 28 with an outflow opening 30 and a first and second inflow opening 32. 34. The first and second liquid flow channel 8, 12 extends from the first subhousing 16 through the outflow opening 30 to the bend 20 in the second subhousing 18. The first liquid flow channel 8 further extends from the bend through the first inflow opening 32 to the first subhousing 16. The second liquid flow channel 12 extends from the bend 20 in the second subhousing 18 via the second inflow opening 34 to the first subhousing 16.

The second subhousing 18 comprises a second sliding surface 36 which lies against the sliding surface 28 of the first subhousing.

In the second sliding surface 36 of the second subhousing 18, an opening 38 is present, through which the first liquid flow channel extends from the outflow opening 30 of the first subhousing and through which, the first liquid flow channel 8 extends from the second subhousing 18 to the first inflow opening 32 of the first subhousing 16. Also, through this opening 38 the second liquid flow channel 12 extends from the outflow opening 30 of the first subhousing 16 through this opening 38, the second liquid flow channel 12 further extending from the second subhousing 18 through this opening 38 to the second inflow opening 34 of the first subhousing 16.

In FIG. 3, the valve is shown in a fully opened condition. The second subhousing 18 is then disposed in a first extreme position relative to the first subhousing 16. In that position, the outflow opening 30 of the first subhousing, as well as the first and second inflow opening 32, 34 of the first subhousing 16 fall within the contours of the opening 38 in the second subhousing. In other words, the second subhousing is slidable along the first subhousing between a first and a second extreme position, whereby in the first extreme position the inflow opening of the first subhousing and a surface of the outflow opening of the first subhousing are overlapped by the surface of the opening in the second subhousing, and in the second extreme position the inflow opening of the first subhousing and/or the outflow opening of the first subhousing is closed off by the second sliding surface of the second subhousing. In other words, in the second extreme position the inflow opening of the first subhousing and/or the outflow opening of the first subhousing is/are closed off by the sliding surface of the second subhousing, while the second subhousing is slidable along the first subhousing between a first and second extreme position, and in the first extreme position the inflow opening of the first subhousing and the outflow opening of the first subhousing form a fluid communication with the opening in the second subhousing. When the valve is to be closed completely or partly, the second subhousing 18 is moved up relative to the first subhousing 16 in the direction of the arrow P by means of electric drive 26. The result is that the first and second inflow opening 32, 34 of the first housing 16 will at least partly be closed off by the second sliding surface 36 of the second subhousing. In an extreme second position, in which the second subhousing 18 is moved up still further relative to the first subhousing 16, the first and second inflow opening 32, 34 are closed off entirely by the second sliding surface 36 of the second subhousing 18. Accordingly, this involves a linear movement of the first subhousing relative to the second subhousing for controlling the liquid flow from the inlet to the two outlets.

In this example, both the first and the second liquid flow channel 8, 12 have an oval shape adjacent the portion 24. The long axis of the oval shape is directed at least substantially perpendicularly to the direction of the arrow P', that is, perpendicularly to a direction of movement of the second subhousing relative to the first subhousing. This provides the advantage that a relatively small stroke in the direction of the arrow F needs to be made to open and close the valve.

In the example, the second sliding surface of the second subhousing comprises an upright edge 40 extending around the opening 38 of the second subhousing. The edge 40 is closed in itself. Further situated on this sliding surface, below the opening 38, is likewise an upright edge 42, closed in itself. The two edges together have the shape of an eight. The edges project relative to a part 43 of the sliding surface of the second subbody where these edges 40, 42 are not situated, in the direction of the sliding surface of the first subhousing. The result is that the edges 40, 42 at their upper side contact the sliding surface 28 of the first subhousing and form a fluid seal with the first sliding surface. The apparatus further comprises means for pressing the first and second subhousing towards each other. In this example, these means consist of a spring 44. As the magnitude of the contact surface between the sliding surface of the first subhousing and the sliding surface of the second subhousing is determined by the surface of the edges 40 and 42, this contact surface is relatively small The result is that the friction arising when the second subhousing 18 is shifted relative to the first subhousing 16 in the direction of arrow P' is relatively small. Since the second subhousing 18 is pressed somewhat springingly against the first subhousing 16, a liquid film can form between the sliding surfaces 28 and 36, so that friction is further reduced. Further, the fluid seal referred to ensures that the liquid flow channel 8 through the valve is fluid-tight, so that no liquid can leak from the liquid flow channel 8.

The invention is not limited in any way to the embodiments outlined hereinbefore. Thus, the above-mentioned oval shape of the inflow opening 32, 34 of the cross section of the liquid flow channel can have a shape deviating from the oval shape at a position in the interface between the first subhousing and the second subhousing, as shown in FIG. 5. In FIG. 5, the cross section contains at its upper side an area 46 of a relatively small width. This means that when through a displacement of the second subhousing relative to the first subhousing this area is gradually closed off by the second sliding surface of the second subhousing, this entails a relatively small change of the liquid flow. The area is therefore suitable for a fine adjustment.

It is also possible to design the valve such that, as desired, it delivers no liquid, delivers liquid from an inlet to a first outlet, or delivers liquid from this inlet to a second outlet. Such a variant is shown in FIGS. 6a–6c. The valve 1 according to FIGS. 6a–6c again comprises a first subhousing 16 and a second subhousing 18. In addition, the valve 1 comprises an inlet 2, a first outlet 4 and a second outlet 6. In the condition shown in FIG. 6a, the valve 1 is closed, since the inlet 2 is not in communication with the first outlet 4 and the second outlet 6. In the position shown in FIG. 6b, the inlet 2 has been connected with the first outlet 4 in that the second subhousing 18 has been moved up relative to the first subhousing 16. Thereafter, in the position shown in FIG. 6c, the inlet 2 is connected with the second outlet 6. Both in the condition according to FIG. 6b and in the condition according to FIG. 6c, a control of the magnitude of the liquid flow is possible through a displacement of the second subhousing 18 relative to the first subhousing 16. An alternative embodiment of the valve is further shown in FIGS. 7a to 7g. In these figures, parts corresponding with the preceding figures have been provided with the same reference numerals. As can be clearly seen in FIG. 7a, between the axial axis of the inlet 2 and the normal 51 to the sliding surfaces 28, 36, an angle α is enclosed which is greater than 0 degrees En and smaller than 90 degrees. Similarly, between the normal 51 and the axial axis of the outlet 4 an angle β is enclosed which is greater than 0 degrees and smaller than 90 degrees. In this example, α+β is approximately equal to 90 degrees. The valve is closed when the second subhousing 18 has been shifted relative to the first subhousing 16 to an extreme lower position. By moving the second subhousing 18 relative to the first subhousing obliquely upwards from this position, the valve will gradually be opened further. Therefore, it holds that the valve is closed by closure of the outflow opening 30 of the first subhousing. In closed condition, the valve can then be drained because the inflow opening 32 is not closed off then. Further, it holds that in closed condition, the contours of the inflow opening, which are located relatively low, coincide with the contours of the opening 38 of the second subhousing 18 and thus do not form ridges behind which residual liquid may be left. The advantage over the apparatus according to FIG. 3 is that downstream of the point 14 no bend is present in the outlet 4. As a result, the resistance the liquid will sustain is reduced. Also, the outlet 4 will be drained faster as a result. Further, scaling of the outlet 4 is minimized. Furthermore, a production-technical advantage is present. Making an internal bend as shown in FIG. 3 can only be made by using two movable cores that touch each other. This contact surface always causes a ridge in the channel, which may entail scale growth.

In this example, the valve further comprises a housing 52 in which further a lever 54 is included. The lever 54 is connected with the housing 52 for rotation about a rotation axis 56. Further, the lever 54 has one side connected with the electrical drive 26 and another side 60 connected with the second subhousing 18 via a leaf spring 62. The second subhousing 18 is made up of a first, plate-shaped body 18" in which an opening 64 is provided, and a second, cup-shaped body 18", open at the bottom, In mounted condition, the cup-shaped body 18" is received in the opening 64. As can be properly seen in FIGS. 7d, 7f and 7g, the width of the opening 32 of the first subhousing 16 on a side bounding the second subhousing 18 decreases from the top down (see FIG. 7f). Further, the opening on the other side of the first subhousing is oval (see FIG. 7g), while the longitudinal axis is directed in the direction of movement of the second subhousing. Accordingly, the liquid flow channel 8 in the first subhousing 16 has a downwardly bulging shape to further prevent residual liquid accumulation when the valve is in a closed condition. Further, the outflow opening 30 has an elongate cross section whose longitudinal axis is directed transversely to the direction of movement of the second subhousing. This in turn provides the advantage that for opening and closing the outflow opening by means of the second sliding surface of the second subhousing by moving the second subhousing from the first extreme position to the second extreme position and vice versa, only a limited stroke is needed. Adjacent the inflow opening on the opposite sides of the first subhousing, the liquid flow channel 8 has an upwardly bulging shape (see FIG. 7g) for providing a liquid flow channel without bends and the like.

In this example, the first subhousing 18 is connected via sealing rings 66 with the inlet 2 and the outlet 4, respectively.

It will be clear that when the end 58 of the lever 54 is moved up by means of the drive 26 from the position as shown in FIG. 7a, then, subsequently, the end 60 of the lever is moved up in the direction of the arrow P', with the result that the second subhousing 18 is moved up in the direction of the arrow P' relative to the first subhousing 16 for gradually opening the valve. For moving the end 58 of the lever 54 down, the drive 26 can be provided with a spring. This provides the advantage that the valve will be closed by the spring when the drive is not active. Also, the drive 26 may be so adapted that it can actively move both up and down.

Referring to FIGS. 8a to 8d, a third alternative embodiment of the valve according to the invention is described. Parts corresponding with the parts of FIGS. 1–5 and 7 are provided with the same reference numeral The second subbody 18 in this example is reciprocable between the first extreme position and the second extreme position in the direction of the arrow P'. The arrow P' in this example is parallel to the direction of the outlet 4. When the second subbody 18 is in the second extreme position as shown in FIG. 8a, the inflow opening 32 of the first subhousing is closed off by the second sliding surface 36 of the second subhousing 18. This as distinct from the apparatus according to FIG. 7a in which in the second extreme position it is the outflow opening 30 that is closed off by the second sliding surface. The second subhousing 18 has a shape substantially corresponding to the shape shown in FIG. 7e. This means that around the opening 38 a first projecting edge 40, closed in itself, is arranged, while moreover a second circumferential projecting edge 42 closed in itself is provided which partly coincides with the first edge 40, the arrangement being such that an 8-shaped edge is obtained. When the second subhousing 18 is in the second extreme position as shown in FIG. 8a, the second edge 42 extends around the inflow opening 32 of the first subhousing and makes contact with the sliding surface 36 of the first subhousing 16. Because the second edge 42 forms a fluid sealing with the sliding surface, this means that the inflow opening 32 of the first subhousing 16 is closed off. Likewise, the first circumferential edge 40 extends around the outflow opening 30 of the first subhousing 16. This circumferential edge 30 forms a fluid communication with the sliding surface 36 of the first subhousing 16. This means that the outflow opening 30 of the subhousing is likewise closed off, in this case by the cavity 38.

When the second subhousing 18 is moved down in the direction of the arrow P', a fluid communication is formed between the outflow opening 30 and the inflow opening 32. In the first extreme position, the first circumferential edge 40 passes around the combination of the outflow opening 30 and the inflow opening 31. As a results the fluid communication between the outflow opening 30 and the inflow opening 32 is wholly cleared. Moreover, it is still ensured that the liquid flow channel 8 then formed, which partly extends through the bend mentioned earlier, is still fluid-tight, so that no liquid can leak from this channel. For the sake of clarity, it is noted that in the apparatus according to FIG. 7 the above-outlined situation is exactly the other way around, that is, in the second extreme position as shown in FIG. 7a the second circumferential edge 42 extend around the outflow opening 30 while the first circumferential edge 40 extends around the inflow opening 32. In the first extreme position in which the valve is opened, the first circumferential edge 40 extends around a combination of the inflow and outflow opening 30, 32. As a result, the outflow opening 30 and the inflow opening 32 are connected with each other via the opening 38 in the second subhousing. The upright edge 40 provides a fluid seal, such that the liquid flow channel 8 is fluid-tight, so that no liquid can leak out. In the variant as shown in variant 8a, the inflow opening 32 in the first subhousing has an elongate cross section of which the longitudinal direction is directed at least substantially transversely to the direction of movement P' of the second subhousing relative to the first subhousing. Thus, again the above-mentioned advantage is obtained that through a small stroke in the direction P' the valve can be opened and closed. Moreover, the fine adjustment referred to is also realized. In the example, incidentally, the outflow opening 30 too has an elongate cross section of which the length direction is directed at least substantially transversely to the direction of movement of the second subhousing relative to the first subhousing. More particularly, in this example, the two above-mentioned elongate cross sections of the inflow opening 30 and the outflow opening 32 have an oval shape.

It should further be noted that the liquid flow path between the inlet 2 and the first ceramic subhousing is formed by a flexible hose 60 of which a cross section is circular adjacent the inlet 2 and elongate, and in particular oval, adjacent the ceramic subhousing. By virtue of the flexible hose 70, the transition from circular to oval can be easily realized. It also holds that the liquid flow path between the first subhousing and the outlet 4 is formed by a flexible hose 72 of which a cross section adjacent the first subhousing has an elongate shape and in particular is oval, and of which a cross section adjacent the outlet 4 has a circular shape. Here, too, the flexible hose is used to enable ready realization of the transition from oval to circular. In particular, the two flexible hose 70, 72 can be manufactured in one piece. Adjacent the inlet 2, the flexible hose 70 is wrapped outwardly about the inlet 2. The flexible hose 72 ends there where the outlet 4 begins.

The apparatus may further comprise an adjusting screw 74 with which the first extreme position can be set. Thus, accordingly, the magnitude of the liquid flow in the first extreme position can be defined, since, depending on the degree to which the adjustment screw 74 is set, it is defined to what extent the second subhousing 18 can move down from the position shown in FIG. 8a and to what extent in that case the inflow opening 32 is cleared. In other words, it is set to what extent the inflow opening 32 in the first extreme position may be closed off by a portion of the sliding surface of the second subhousing 18.

In this example, the edges referred to are part of the second sliding surface of the second subhousing 18. It is also possible, however, that the first sliding surface is provided with a first and second circumferential edge closed in itself with the first edge extending around the outflow opening 30 and the second edge extending around the outflow opening 32. The second sliding surface of the second subhousing 18 then does not comprise any edges and is of flat design. The edges referred to of the first subhousing then form a fluid seal with the second sliding surface of the second subhousing 18. It is also possible to use an adjusting screw for setting the around extreme position. Such variants are understood to fall within the framework of the invention.

One possible application of the ceramic valve according to FIGS. 1–5 and. 7 and 8 will be briefly discussed with reference to FIG. 9. FIG. 9 shows a beverage machine 50 for preparing a beverage suitable for consumption, such as tea and coffee. The beverage machine is provided with a water reservoir 52, a device 54, known per se, comprising a holder filled with ground coffee or a coffee extract, for obtaining the beverage suitable for consumption under supply of water from the water reservoir to the device 54, a liquid flow path extending from the water container 52 to the device 54 and the electrically operable ceramic valve 1 according to FIG. 1, included in the liquid flow path In this example, the valve 1 is used for: controlling the supply of water to the device 64. FIG. 10 shows an alternative embodiment of a beverage machine 50 in which the valve according to FIGS. 6a–6c is implemented. Here, the valve 1 is used for selectively supplying water from the water reservoir 52 to the device 54' known per se, which is adapted for preparing tea, or to a device 54", known per se, adapted for preparing coffee. The valve is suitable for controlling a liquid flow from a boiler which works under atmospheric pressure. The valve is also suitable for boilers that work under a pressure that is higher than atmospheric pressure. In the latter case, the liquid can take a temperature of, for instance, 125° C. The valve is suited to function properly at such a temperature. Such variants are also understood to fall within the scope of the invention

What is claimed is:

1. An electrically operable ceramic valve of a beverage machine which is adapted for preparing beverages suitable for consumption, comprising at least one inlet, at least one outlet, and at least one liquid flow channel extending between the inlet and the outlet, the ceramic valve further comprising a first ceramic subhousing and a second ceramic subhousing through which the liquid flow channel extends and which are designed to be displaceable along each other by means of an electric drive, for controlling a liquid flow from the inlet to the outlet, the liquid flow channel comprising a bend extending at least for a part in the second subhousing, while the liquid-flow channel in an opened condition of the valve extends upstream of the second subhousing and downstream of the second subhousing in at least the first subhousing, and the first subhousing comprises a first sliding surface having at least one outflow opening and at least one inflow opening, the liquid flow channel extending from the first subhousing through the outflow opening to the bend in the second subhousing, and the liquid flow channel extending from the bend through the inflow opening into the first subhousing, while the second subhousing comprises a second sliding surface, characterized in that the first sliding surface comprises at least one circumferential edge, closed in itself, which projects relative to a part of the first sliding surface where this edge is not situated, in the direction of the second sliding surface, so that an upper side of this projecting edge abuts against the second sliding surface and forms a fluid sealing with the second sliding surface, or that the second sliding surface comprises at least one circumferential edge, closed in itself, which projects relative to a part of the second sliding surface where this edge is not situated, in the direction of the first sliding surface, so that an upper side of this projecting edge abuts against the first sliding surface and forms a fluid sealing with the first sliding surface.

2. A valve according to claim 1, characterized in that in the sliding surface of the second subhousing an opening is present through which, in an opened condition of the valve, the liquid flow channel extends from the outflow opening of the first subhousing, and through which the liquid flow channel extends from the second subhousing to the inflow opening of the first subhousing.

3. A valve according to claim 2, characterized in that the at least one edge of the second sliding surface comprises a first edge, the first edge extending around the opening of the second subhousing.

4. A valve according to claim 3, characterized in that the at least one edge of the second sliding surface comprises a second edge, with the first and second edge together taking the shape of an eight.

5. A valve according to any one of claims 2–4, characterized in that the second subhousing is slidable along the first subhousing between a first and second extreme position, while in the first extreme position the inflow opening of the first subhousing and the outflow opening of the first subhousing form a fluid communication with the opening in the second subhousing, and in the second extreme position the inflow opening of the first subhousing and/or the outflow opening of the first subhousing is/are closed off by the sliding surface of the second subhousing.

6. A valve according to claim 1, characterized in that the liquid flow channel has a cross section of an oval shape at least one position in the interface between the first subhousing and the second subhousing.

* * * * *